(12) United States Patent
Gorniak et al.

(10) Patent No.: US 6,851,562 B2
(45) Date of Patent: Feb. 8, 2005

(54) PUSH BACK STORAGE RACK SYSTEM

(75) Inventors: Theodore S. Gorniak, North East, PA (US); John B. Pellegrino, Erie, PA (US); James A. Courtwright, North East, PA (US)

(73) Assignee: Ridg-U-Rak, Inc., North East, PA (US)

(*) Notice: Subject to any disclaimer, the term of this patent is extended or adjusted under 35 U.S.C. 154(b) by 623 days.

(21) Appl. No.: 09/971,752

(22) Filed: Oct. 4, 2001

(65) Prior Publication Data

US 2004/0112851 A1 Jun. 17, 2004

Related U.S. Application Data

(60) Provisional application No. 60/237,797, filed on Oct. 4, 2000.

(51) Int. Cl.[7] .................................................. A47F 5/00
(52) U.S. Cl. ..................... 211/59.2; 211/151; 414/276; 414/286
(58) Field of Search .............................. 211/151, 59.2; 414/276, 286

(56) References Cited

U.S. PATENT DOCUMENTS

| | | | |
|---|---|---|---|
| 2,950,014 A | 8/1960 | Sullivan ...................... 211/151 |
| 3,038,613 A | 6/1962 | Sylvester et al. ........... 211/162 |
| 3,399,784 A | 9/1968 | Buchbinder et al. ........ 211/151 |
| 3,465,894 A | 9/1969 | Setecka ...................... 211/129 |
| 3,567,039 A | 3/1971 | Evans ......................... 211/162 |
| 3,744,646 A | 7/1973 | Duncan et al. ............. 211/162 |
| 3,757,967 A | 9/1973 | Colbridge ................. 214/16.4 |
| 4,140,225 A | 2/1979 | Hilgers et al. .............. 211/162 |
| 4,155,462 A | 5/1979 | Bendel ....................... 211/151 |
| 4,197,047 A | 4/1980 | Haldimann ................. 414/276 |
| 4,223,792 A | 9/1980 | Aspen ........................ 211/162 |
| 4,341,313 A | 7/1982 | Döring ....................... 211/151 |
| 4,462,500 A | 7/1984 | Konstant et al. ............ 211/151 |
| 4,613,270 A | 9/1986 | Konstant et al. ............ 414/276 |
| 4,657,317 A | 4/1987 | Gemma ....................... 312/198 |
| 4,687,404 A | 8/1987 | Seiz et al. .................. 414/276 |
| 4,715,765 A | 12/1987 | Agnoff ........................ 414/276 |
| 4,738,369 A | 4/1988 | Desjardins .................. 211/113 |
| 4,773,546 A | 9/1988 | Konstant .................... 211/151 |
| 4,915,240 A | 4/1990 | Konstant .................... 211/151 |
| 4,949,852 A | 8/1990 | Allen .......................... 211/151 |

(List continued on next page.)

OTHER PUBLICATIONS

ARTCO Planning... Ad, ARTCO Corporation, Apr. 1990.
Speedcart Brochure, Speedrack Inc. 1982.
Speedcart Brochure, Speedrack Inc. 1984.

(List continued on next page.)

*Primary Examiner*—Robert W. Gibson, Jr.
(74) *Attorney, Agent, or Firm*—Edward W. Goebel, Jr., Esq.; Jon L. Woodard; MacDonald Illig Jones & Britton LLP (57) ABSTRACT

A push back storage rack system for storing multiple loads in a single inclined cart lane. Each lane contains at least two wheeled carts, each cart being capable of receiving and storing multiple pallet loads. The carts are vertically spaced so that they can freely slide underneath each other when unloaded. Beginning with the first or lowest level cart in the system, each successively higher cart is also wider and longer than the cart immediately beneath it. The carts are positioned on at least one but potentially two pairs of rectangular tracks or tubes, each tube being capable of supporting two or four individual carts, depending on how the carts are constructed and installed on the tubes. The tubes are mounted on an incline away from a loading end of each lane so that when loads are placed on or are removed from a lane, the carts are biased toward the loading end of the lane by the force of gravity. Each tube has a single, planar upper support surface which has inside and outside edges. The wheels of each cart ride only on either the inside or outside edges of the tubes on which they are mounted, allowing more than one vertically spaced cart to occupy the same tube.

13 Claims, 7 Drawing Sheets

U.S. PATENT DOCUMENTS

| | | | |
|---|---|---|---|
| 4,955,489 A | 9/1990 | Allen | 211/151 |
| 4,982,851 A | 1/1991 | Konstant | 211/151 |
| 4,988,251 A | 1/1991 | Kinney | 414/276 |
| 5,080,241 A | 1/1992 | Konstant | 211/151 |
| 5,137,159 A | 8/1992 | Collins et al. | 211/151 |
| 5,141,118 A | 8/1992 | Gay | 211/151 |
| 5,170,896 A | 12/1992 | Konstant | 211/151 |
| 5,178,288 A | 1/1993 | Werner et al. | 211/151 |
| 5,180,069 A | 1/1993 | Krummell et al. | 211/151 |
| 5,184,738 A | 2/1993 | Allen | 211/151 |
| 5,203,464 A | 4/1993 | Allen | 211/151 |
| 5,285,909 A | 2/1994 | Slater | 211/151 |
| 5,312,004 A | 5/1994 | Krummell et al. | 211/151 |
| 5,328,038 A * | 7/1994 | Allen | 211/151 |
| 5,393,188 A | 2/1995 | Scott et al. | 414/276 |
| 5,482,422 A * | 1/1996 | Hammond | 414/276 |
| 5,598,934 A | 2/1997 | Krummell et al. | 211/151 |
| 6,129,223 A * | 10/2000 | Krummell, Jr. | 211/151 |
| 6,158,943 A * | 12/2000 | Sullivan | 414/286 |

OTHER PUBLICATIONS

The New Concept in Order–Picking Systems, Brochure, Frazier Industrial Co., Sept. 1963.

Hi–Line HIPIR Kart Brochure, Warehouse Storage Systems Co., 1986.

Steadiflo Pushback Brochure, 3D Storage Systems, Limited, 1998.

Advance Lo–Pro Push Back 2, 3 or 4 Deep Brochure, Advance Storage Produce, 1994.

Advance Lo–Pro 3 & 4 Deep Pushback System Technical Bulletin, Advance Storage Products, 1993.

Advance Pushback Storage Systems 2, 3, 4 or 5 Deep Brochure, Advance Storage Products.

Konstant Flow Brochure, Konstant Products, Skokie, IL.

Speedrack Ad, Material Handling Management Magazine, Jul. 2001.

Space—Cart Brochure, Space Rak, Division of EWCO, 1991.

Mallard Flo–Cart Brochure, Mallard Manufacturing Corporation, Sep. 1988.

Push Back Rack Brochure, Interlake Material Handling Division, 1991.

Push–Back Rack Technical Manual, Interlake Material Handling Division, 1991.

* cited by examiner

PUSH BACK STORAGE RACK SYSTEM

This application claims the benefit of U.S. Provisional Application No. 60/237,797 filed on Oct. 4, 2000, which is incorporated herein by reference.

BACKGROUND

The present invention is directed to the field of storage rack systems. More particularly, the present invention is directed to a push back type of storage rack system for storing a plurality of loads in which multiple loads may be stored in a single storage lane.

Push back storage racks normally comprise an assembly of shelves and vertical uprights for supporting loads placed on tracks or other base members in one or more storage lanes. Each storage lane has one loading position capable of storing one load. One or more vertically spaced push back carts are positioned in the loading position. Each cart is capable of receiving one load, being pushed toward the back of the lane by the next load, and sliding over the top of one another when unloaded. Such systems normally have their tracks in each lane tilted toward the loading position so that the force of gravity causes the next cart in line to return to the loading position when a load occupying the position is removed.

When adding a load to a particular lane, the operator pushes the added load against a previously stored load occupying the lane's loading position. This forces the cart under the previously stored load further up the lane and out of the loading position, thereby making room for the load being added. If additional carts are in the loading position, the operator then positions the load on the next available cart. If all the carts have been pushed out of the loading position, the added load fills the lane to capacity, and the operator places the added load directly onto the tracks or base member of the lane itself.

Previous push back storage systems have also included designs which permit unloaded carts to automatically slide into the loading position of their respective storage lanes to receive loads. Most designs allow the empty carts to simultaneously occupy the same loading position by incorporating either a nesting or telescoping cart arrangement.

In previous nesting designs, higher level carts retract or nest within the horizontal dimensions of each next lower level cart. Such designs have been limited in both the number of carts that can be included in a single system and in the relative strength of each cart since the designs typically require the use of a single pair of track members and since the required horizontal clearance for successive carts prevents the inclusion of structural cross members. Due to the resulting limitations on the amounts of available space in such designs, these characteristics have also severely limited the number of carts that can be used and thus the number of loads that can be stored in a single lane. Additionally, smaller and weaker components may be used which substantially reduce the load-bearing capabilities of the system. In addition to substantially limiting the system's load-bearing capacity, smaller components, such as cart wheels, also tend to increase the amount of external force necessary to operate such systems. This ultimately leads to the need for more steeply sloped track inclines, which are undesirable, and normally increases the amount of wear and potential damage to the system, loading equipment, and stored loads.

In previous telescoping designs, individual carts have been vertically spaced so that each higher level cart merely slides over the top of the next adjacent lower level cart. Previous telescoping designs have been severely limited in the number of carts that can be incorporated in a single lane due to the vertical space needed to include a rigid support piece across the width of each cart. Such cross pieces tend to make the additional vertical height required for each cart too great to incorporate many carts into a single lane. In contrast, eliminating such pieces tends to severely reduce the load capacity of each individual cart.

Previous telescoping designs have also been limited by the fact that most use only a single pair of track members with one or more support surfaces upon which the wheels of the various carts ride. As with nesting designs, this characteristic of most telescoping designs has severely limited the number of carts and thus the number of loads which can be included in a single lane, while posing the same problems of wear, potential damage to the system, equipment, and loads. In the few instances where multiple pairs of tracks have been incorporated, some portions of the various support surfaces have been left unused. As a result, both space and load-bearing capacities have been wasted in such previous systems, reducing their cost-effectiveness and versatility.

In some previous designs, push plates have been positioned at the trailing edge of the lowest or last-loaded cart to assure that an operator maintains proper pallet clearance during loading and to indicate, when it is not visible to the operator, that a particular lane is filled to capacity. It has been observed from time to time that pallets on which loads are stored drag against an adjacent surface of the push plate, causing damage to the pallets during loading and unloading.

Many of the previous designs of push back rack systems have also been plagued by the problem of outward bowing of the beam adjacent each lane's loading position. The problem is associated with the repeated forces exerted by a system's carts as they automatically return to their respective loading positions. As each cart repeatedly returns to this position, stopping forces are exerted upon the adjacent beam member which, over time, tends to bend or warp outwardly and away from the storage lane in which it is mounted This is an additional problem which previous push back storage systems have yet been unsuccessful in resolving.

SUMMARY

The present invention is a push back storage rack system for storing a plurality of pallet loads in which multiple loads may be stored in a single storage lane. Each lane contains at least two wheeled carts, each cart being capable of receiving and storing multiple pallet loads. The carts are vertically spaced so that they can freely slide underneath each other when unloaded. Beginning with the first or lowest level cart in the system, each successively higher cart is also wider and longer than the cart immediately beneath it. The carts are positioned on at least one but potentially two pairs of rectangular tracks or tubes, each tube being capable of supporting two or four individual carts, depending on how the carts are constructed and installed on the tubes. The tubes are mounted on an incline away from a loading end of each lane so that when loads are placed on and removed from a lane, the carts are biased toward the loading end of the lane by the force of gravity. Each tube has a single, planar upper support surface which has inside and outside edges. The wheels of each cart ride only on either the inside or outside edges of the tubes on which they are mounted, allowing more than one vertically spaced cart to occupy the same tube. A support beam is located at the loading end of each lane.

The end of each cart closest to the loading end of the lane in which the cart is mounted is the trailing end of the cart and the opposite end of each cart is the leading end. When the carts are unloaded and positioned in a loading position at the loading end, the trailing end of the lowest cart rests flush against the adjacent support beam. The carts are constructed so that each successively higher cart is slightly longer than the next cart below. Following the lowest level cart of the system, a structural member at about the leading end of each successively higher cart contacts a structural member at about the leading end of the cart immediately below it when returning to the loading position. This transfers the impact force of each load to the trailing end of the lowest cart, thereby minimizing curling and excessive warping of the beam. Additionally, tensionbars positioned between approximately the middle of the structural beam and other structural members of the rack system also serve to significantly reduce the bowing or warping effect to a minimum. A push plate mounted on the trailing end of the lowest cart is offset from vertical, away from this cart, to prevent dragging on the end of pallets and subsequent damage to individual pallets and loads.

In the preferred embodiment of this invention the structural member at the leading end of each cart is an angle plate having two sections at a 90° angle to one another. The fact that each successively higher cart is slightly longer than the next lower cart enables the end of each cart's horizontal section to contact the vertical section of the cart beneath it so that the carts stack above one another without greatly adding to the vertical height needed for each additional cart. Additionally, the vertical section of each leading angle piece provides rigidity for supporting heavy loads.

At the trailing edge of each cart, relatively thin loading plates can also stack without adding a great deal of vertical height to the system. To maintain rigidity, vertical stiffeners extend downward below each loading plate, substantially along the width of the cart. For each successively higher cart, the stiffener is placed slightly further away from the cart's trailing edge than the stiffener on the cart immediately beneath it, allowing the stiffeners to remain clear of each other when the carts are stacked in the loading position.

In an optional embodiment of the design, up to four additional carts may be included in the system. In this embodiment, the wheels of every second adjacently spaced pair of carts travel along the same edges of a particular pair of tubes, the two adjacent carts being interlocked by having the trailing wheels of one cart positioned between the leading and trailing wheels of the other. Thus, it becomes possible to position twice the number of carts on the same number of tubes without consuming substantial additional space.

The narrow stacking characteristics inherent in this novel design enable as many as nine loads to be positioned in a single storage lane. Each individual cart, up to a maximum of eight, can store one load. A ninth load can then be positioned directly on the storage lane's tubes after all of the carts are loaded. For applications requiring the storage of five or fewer loads per lane, minor modifications to the design enable the system to be even more compact. The use of multiple rails and interlocked carts enable heavier components, such as wider and higher capacity wheels, to be incorporated into the design. Such components require less external force for operation, allowing for a gentler inclined slope for the inclined tubes and a higher load capacity for the individual carts, thereby reducing the amount of wear and potential damage experienced by the system, stored loads, and loading equipment.

Other embodiments of the invention include mechanisms for preventing accidental lifting or disengagement from the tubes without increasing the sizes of successive carts. In one embodiment, wheels from the one or two carts positioned on the inside edges of the outer tubes are positioned to extend toward the carts' middle portions in order to provide clearance for vertical anti-lift extensions that reach downwardly from the carts on the outside edges of the inside tubes. The inner carts, in turn, have horizontal flanges which prevent vertical movement of the outer carts. In another embodiment, the system's lowest and highest carts dispose vertical extensions which lock the carts to stop flanges located below the inside edges of the inside tubes and below the outside edges of the outside tubes, respectively. A series of interlocked flanges positioned between the individual carts then works as an integrated mechanism to prevent vertical movement of the carts. Both of these embodiments save additional space and enable the incremental spacing of successive carts to remain substantially constant regardless of the particular tube or edge on which the cart's wheels are positioned.

Various other features, advantages, and characteristics of the present invention will become apparent to one of ordinary skill in the art while reading the following specification. This invention does not reside in any one of the features of the push back rack system disclosed below. Rather, this invention is distinguished from the prior art by its particular combination of features which are disclosed. Important features of this invention have been described below and shown in the drawings to illustrate the best mode contemplated to date for carrying out this invention.

Those skilled in the art will realize that this invention is capable of embodiments which are different from those shown and described below and that the details of the structure of this push back rack system can be changed in various manners without departing from the scope of this invention. Accordingly, the drawings and description below are to be regarded as illustrative in nature and are not to restrict the scope of this invention. The claims are to be regarded as including such equivalent push back rack systems as do not depart from the spirit and scope of the invention.

BRIEF DESCRIPTION OF THE DRAWINGS

For a more complete understanding and appreciation of this invention and many of its advantages, reference should be made to the following, detailed description taken in conjunction with the accompanying drawings wherein.

DETAILED DESCRIPTION OF THE
PREFERRED EMBODIMENTS

Referring to the drawings, identical reference numerals and letters designate the same or corresponding parts throughout the several figures shown in the drawings.

Figure 1:
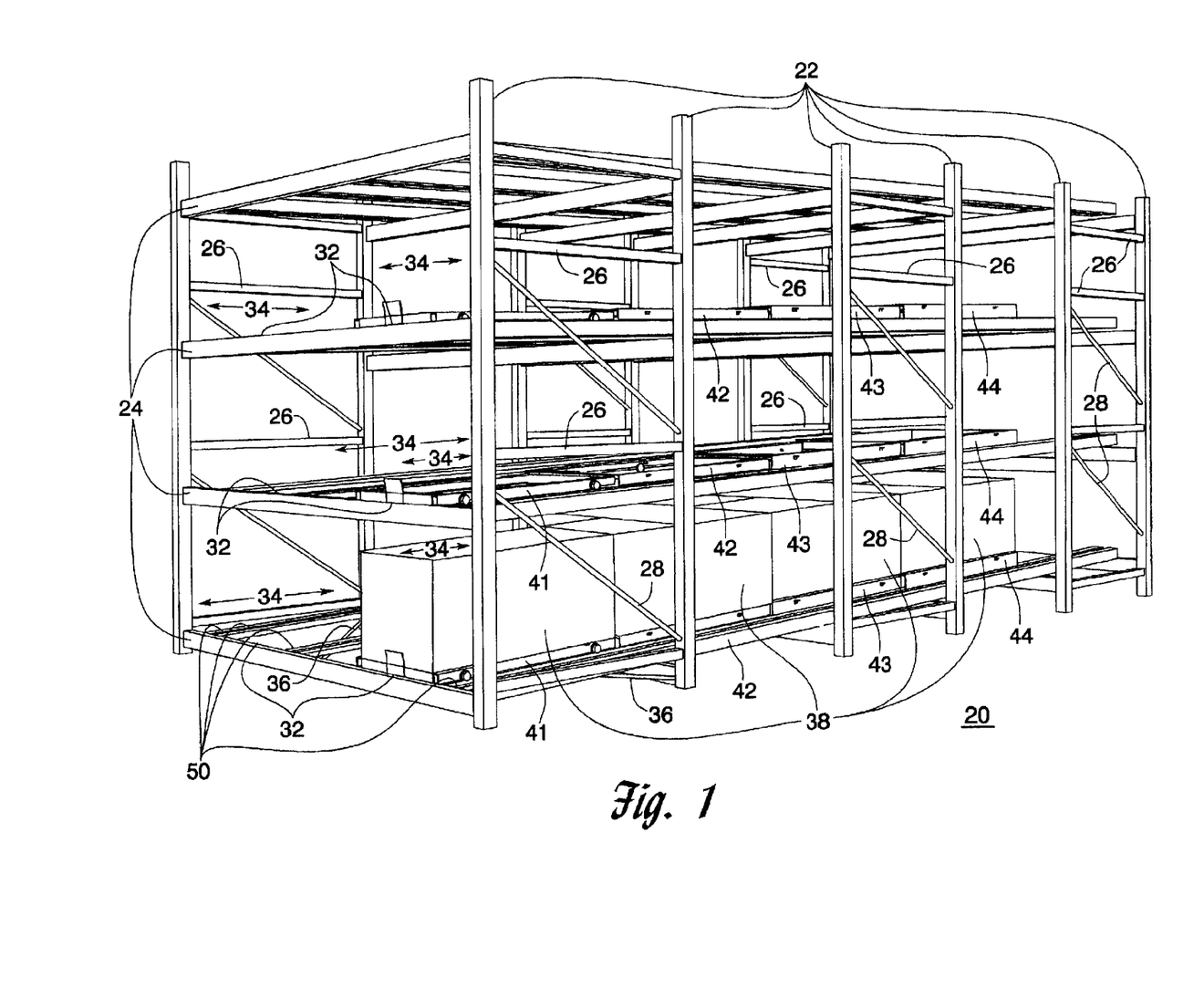
FIG. 1 is a perspective view of a push back storage rack system according to the invention illustrating the relative positioning of carts and loads in multiple independently operating lanes positioned throughout the system.

FIG. 1 shows a push back storage rack system of the type that is the subject matter of the invention. The system is based on a storage rack assembly 20 comprising a number of interconnected, vertical uprights 22 and horizontal beams 24. Side horizontals 26 and diagonal cross pieces 28 may also extend between the vertical uprights 22 to make up rack cells 30 along the depth of the rack system. Two separate cart lanes 34, each having a load end 32, are positioned along the lengths of the beams 24. To prevent the beams 24 from bowing outwardly and away from the rest of the system due to the stresses exerted on the beams 24 during operation, one or more diagonal tension bars 36 may also be positioned between about the center of one or more of the beams 24 and one or more vertical uprights 22 under the cart lanes 34. Alternatively, diagonal tension bars may be fastened between about the center of a beam 24 and a beam at the end of the first rack cell 30 that is connected to the uprights 22 at the end of that rack cell. As shown in FIG. 1, a separate push back assembly occupies each individual lane 34.

Figure 2:
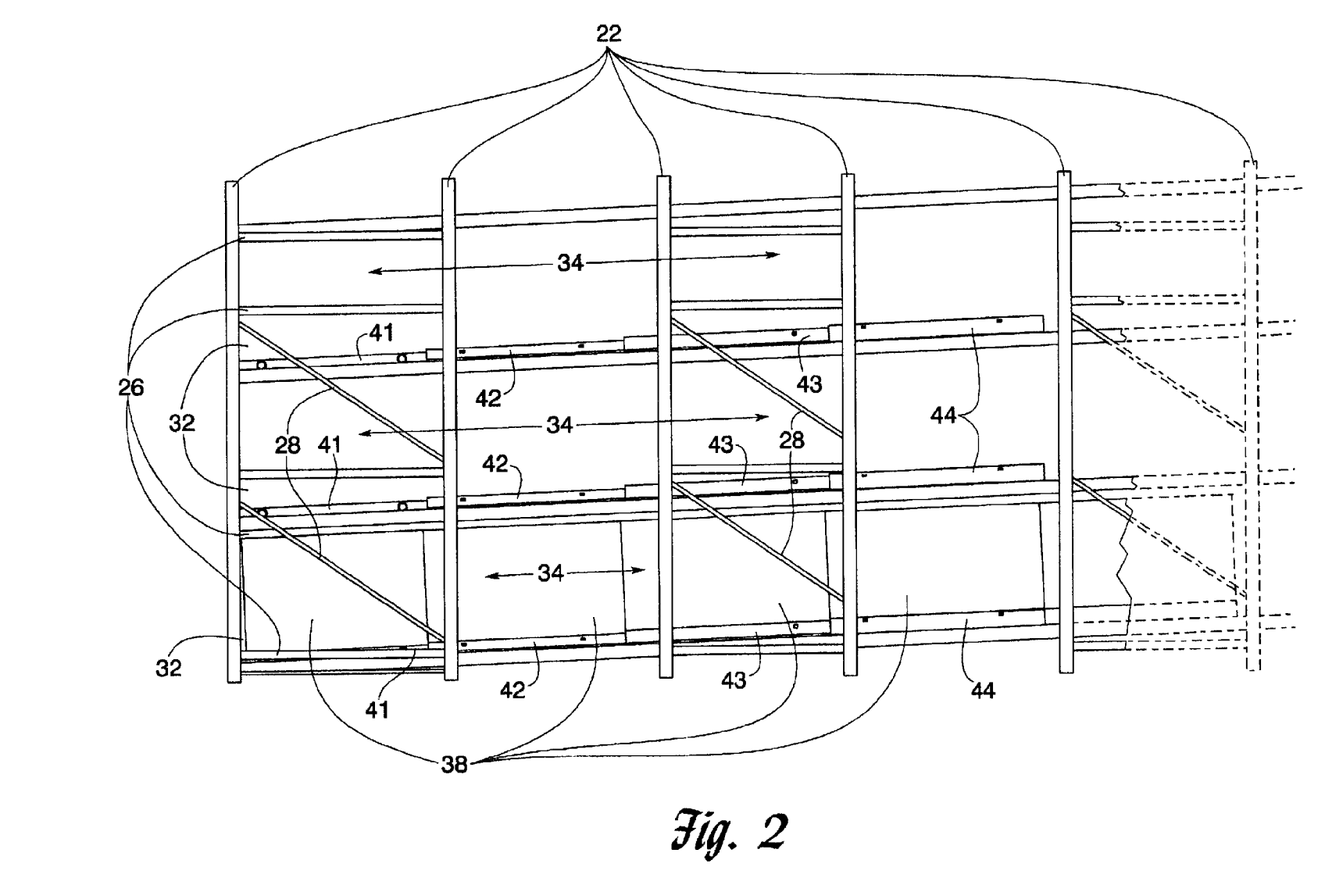
FIG. 2 is a side view of the push back storage rack system of FIG. 1, further demonstrating the relative inclines of the individual vertically spaced storage lanes.

Referring briefly to FIG. 2 along with FIG. 1, the storage rack assembly 20 is capable of storing multiple loads 38 in each cart lane 34. Each load 38 is placed on a separate cart that rides on a set of tracks which are mounted at a slight incline away from the loading end 32 of the cart lane 34. First, second, third, and fourth carts 41, 42, 43, and 44 are shown in an extended position in three vertically stacked cart lanes 34 on tracks which comprise a pair of tubes 50 that extend along their respective cart lane 34.

Figure 3:
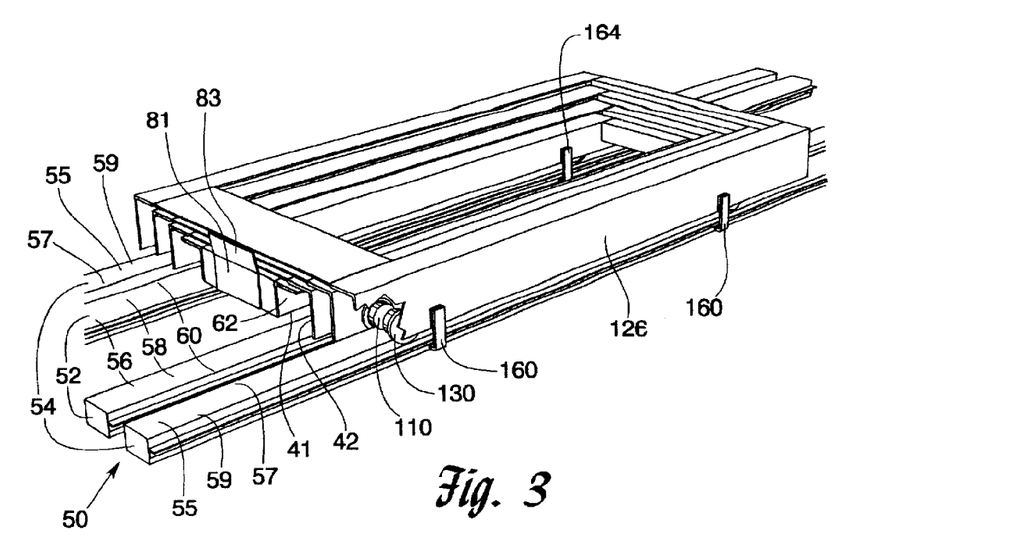
FIG. 3 is a perspective view of an independent push back storage system as would typically occupy one cart lane having four individual and unloaded carts as if positioned at the loading end of a particular lane.
Figure 4:
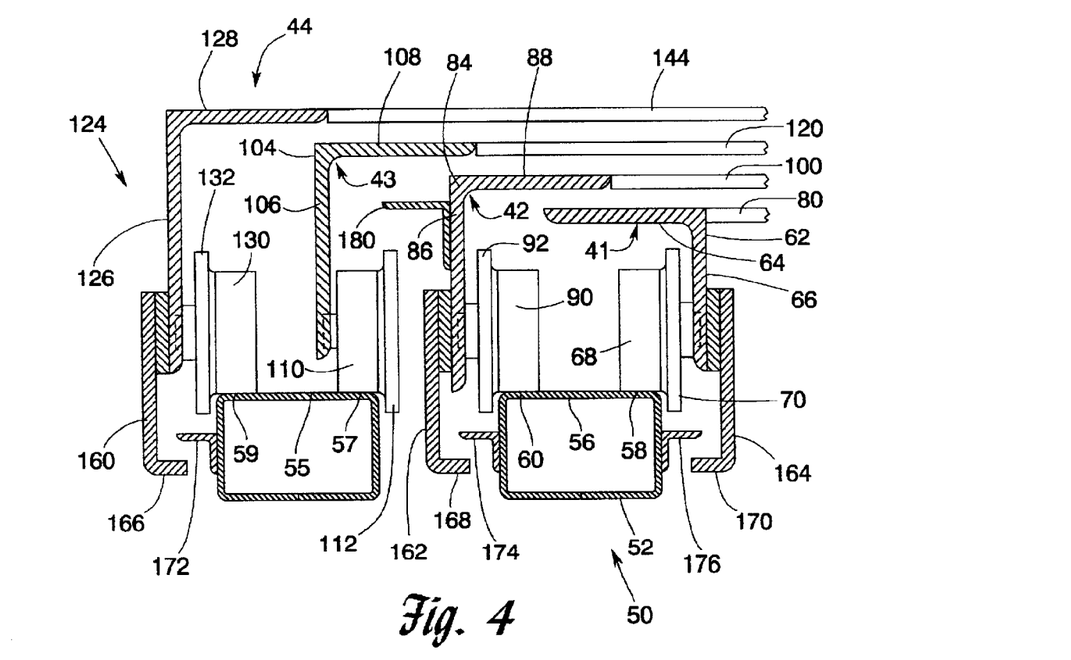
FIG. 4 is a front view of two adjacent tubes from the push back storage system of FIG. 3 depicting the respective wheels, angle plates, and hold-down cart components positioned adjacent to the depicted tubes.

The four-cart configuration of the carts 41-44 is depicted in its unloaded position in FIGS. 3 and 4. The pair of tubes 50 includes a pair of parallel inside tubes 52 and a pair of parallel outside tubes 54. Each of the inside tubes 52 has a single upper support surface 56 having an inside edge 58 and an outside edge 60. In this embodiment, each outside tube 54 is substantially similar to each inside tube 52, with the outside tubes 54 also each having a single upper support surface 55, an inside edge 57 and an outside edge 59.

Figure 5:
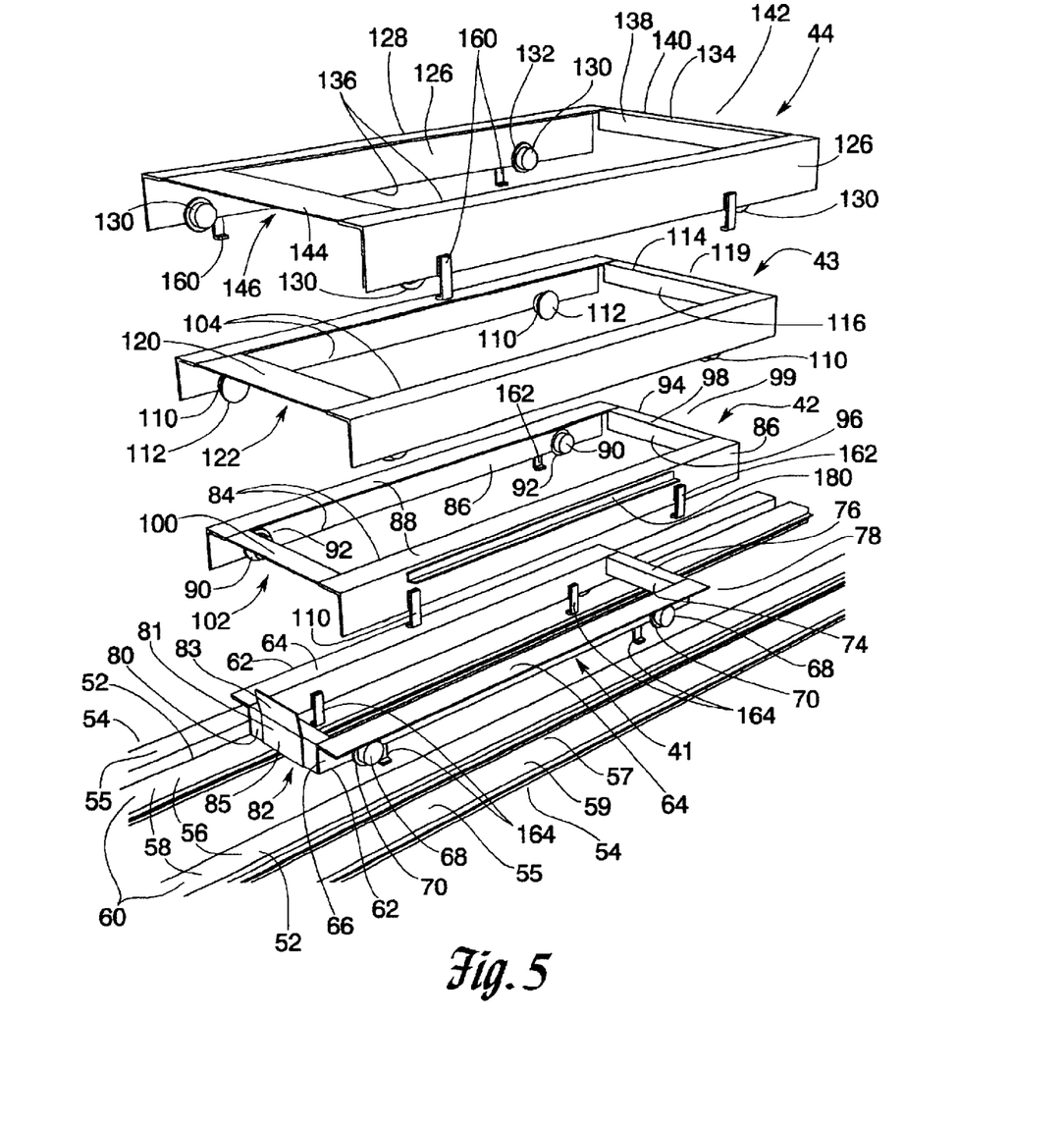
FIG. 5 is an exploded view of the push back storage system of FIG. 3 depicting the structural details of the individual carts of the system.

As shown in FIG. 5, the first cart 41 has a pair of parallel side angle plates 62 with each angle plate 62 having a substantially horizontally planar surface 64 and a substantially vertically planar surface 66. The horizontal surface 64 extends outwardly from the vertical surface 66 and away from the middle of the first cart 41. Each vertical surface 66 has at least two cart wheels 68 mounted on it which are positioned to ride directly on the inside edge 58 of the upper support surface 56 of the inside tube 52 on which they are mounted. The first cart's wheels 68 also extend outwardly and away from the middle of the first cart 41. Each wheel 68 has a flanged edge 70 for engaging the inside edges 58 of the tubes 52 and for properly positioning the wheels 68.

Each cart has a leading end which is the end that is farthest from the loading end 32 of the cart lane 34 in which it is located and has a trailing end which is farthest from the loading end 32. Referring again to FIG. 5, a structural member shown as a leading angle plate 72 extends between the side angle plates 62 at the leading end of the first cart 41. Like the side angle plates 62, the leading angle plate 72 has a substantially vertically planar surface 74 and a substantially horizontally planar surface 76 forming the cart's leading end 78. A trailing connecting tube 80 also extends between the side angle plates 62 forming a trailing end 82 of the cart 41.

A push plate 81 is mounted at the cart's trailing end 82. Though having a substantially vertically planar lower surface 85, the push plate 81 has an upper portion 83 that is bent slightly, for example five degrees away from vertical, leaning away from the first cart 41. The functional advantages of this feature are examined more closely below.

Referring back to FIG. 4, the second cart 42 rides on the outside edges 60 of the upper support surfaces 56 of the inside tubes 52. The second cart 42 has a pair of parallel side angle plates 84 with each angle plate 84 having a substantially vertically planar surface 86 and a substantially horizontally planar surface 88. The horizontal surface 88 extends inwardly from the vertical surface 86 and toward the middle of the second cart 42. Each vertical surface 86 also has at least two cart wheels 90 mounted on it which are positioned to ride directly on the outside edge 60 of the inside tube 52 on which they are mounted. The second cart's wheels 90 also extend inwardly and toward the middle of the second cart 42. Each wheel 90 has a flanged edge 92 for properly positioning the wheels 90 and for engaging the outside edges 60 of the tubes 52.

As best shown in FIG. 5, a structural member shown as a leading angle plate 94 extends between the side angle plates 84 of the second cart 42. The leading angle plate 94 also has a substantially vertically planar surface 96 and a substantially horizontally planar surface 98 forming the cart's leading end 99. A trailing loading plate 100 extends between the side angle plates 84 forming the trailing end of the second cart 102.

Referring again to FIG. 4, the third cart 43 rides on the inside edges 57 of the upper support surfaces 55 of the outside tubes 54. The third cart 43 has a pair of parallel side angle plates 104 with each angle plate 104 having a substantially vertically planar surface 106 and a substantially horizontally planar surface 108. The horizontal surface 108 extends inwardly from the vertical surface 106 and toward the middle of the third cart 43. Each vertical surface 106 also has at least two cart wheels 110 mounted on it which are positioned to ride directly on the inside edge 52 of their respective outside tube 54. The third cart's wheels 110 also extend inwardly and toward the middle of the third cart 43. Each wheel 110 has a flanged edge 112 for engaging the inside edges 57 of the tubes 54 and for properly positioning the wheels 110 on these tubes.

Again as best shown in FIG. 5, a structural member shown as a leading angle plate 114 extends between the side angle plates 104 of the third cart 43. The leading angle plate 114 also has a substantially vertically planar first surface 116 and a substantially horizontally planar second surface 118 forming the cart's leading end 119. Like the second cart 42 and unlike the first cart 41, a trailing loading plate 120 extends between the side angle plates 104 forming the trailing end of the third cart 122.

Referring once again to FIG. 4, the fourth cart 44 rides on the outside edges 59 of the upper support surfaces 55 of the outside tubes 54. The fourth cart 44 has a pair of parallel side angle plates 124 with each angle plate 124 having a substantially vertically planar surface 126 and a substantially horizontally planar surface 128. The horizontal surface 128 extends inwardly from the vertical surface 126 and toward the middle of the fourth cart 44. Each vertical surface 126 also has at least two cart wheels 130 mounted on it which are positioned to ride directly on the outside edge 59 of their respective outside tube 54. The fourth cart's wheels 130 also extend inwardly and toward the middle of the fourth cart 44. Each wheel 130 has a flanged edge 132 for engaging the outside edges 59 of the tubes 54 and for properly positioning the wheels 130 on these tubes.

Again as best shown in FIG. 5, a structural member shown as a leading angle plate 134 extends between side angle plates 136 of the fourth cart 44. The leading angle plate 134 also has a substantially vertically planar surface 138 and a substantially horizontally planar surface 140 forming the cart's leading end 142. Like the second and third carts 42 and 43, and unlike the first cart 41, a trailing loading plate 144 extends between the side angle plates 136 forming the trailing end 146 of the fourth cart 44.

In operation, carts 41–44, being unloaded, remain positioned over top of one another at the loading end 32 of their lane as shown in FIG. 3. The fourth cart 44, being the highest cart in the system, stands available to receive a load. Referring to FIG. 1, the operator, using appropriate lifting equipment, lifts and carries a load 38 over the beam 24 at the loading end 32 of the selected lane 34. The load 38 is then lowered into position on the fourth cart 44.

While positioning the load 38, the operator carefully raises the load 38 to a sufficient height so that the load 38 has adequate vertical clearance to avoid contact with the push plate 81. As noted above, the push plate 81 has an upper portion 83 that is bent slightly away from the first cart 42. As the operator lowers the load 38 into position, the slight bend of the push plate's upper portion 83 allows a pallet carrying the load 38 to contact the inside planar surface of the upper portion 83 rather than contact the push plate 81 along its top edge 148. This reduces the likelihood of damage to the pallet or to the load 38 that could potentially result from the heavy downward force of the load 38 being exerted against the top edge 148. Additionally, when a load 38 is removed, the slight bend of the upper portion 83 of the push plate 81 reduces friction between the pallet and the push plate, reducing the potential for damage to the pallet.

After positioning a load 38 on the fourth cart 44, the operator positions an additional load 38 by lifting the additional load with appropriate lifting equipment and carrying the load 38 over the selected lane's beam 24. As it is carried forward, the load 38 contacts the previously positioned load 38, pushing the load 38 and its supporting fourth cart 44 further up the inclined outer tubes 54. The fourth cart 44 slides away from the loading end 32 of the cart lane 34, making the third cart 43 available to receive the next load 38. This load is then lowered into the cart lane 34 at the lane's loading end 32.

Subsequent loads 38 are added to the cart lane 34 in a similar manner. The operator uses each subsequent load 38 to push the previous load 38 and its respective cart further up the inclined tubes 52 and 54, thereby making the next lower cart available to receive and store the subsequent load 38. In an embodiment of the design using four carts, up to five loads may be positioned at one time in the same cart lane 34. After the first cart 41 has been loaded with a fourth load, the operator can add a fifth load by pushing the fifth load against the load 38 previously positioned on the fourth cart 41. Thus the first cart 41 and the load on it slide further up the inclined tubes 52. The operator then lowers the fifth load directly on to the tubes 52 and 54, filling the cart lane 34 to capacity. The push plate 81, mounted on the first cart 41, then moves along with the first cart 41 away from the loading end 32 of the cart lane 34 where it is blocked from view by the fifth load. Since the push plate 81 is not visible, the operator knows the cart lane 34 is fully loaded.

During the unloading of the cart lane 34, individual loads 38 are removed from the tubes or from their respective carts, allowing the carts 41–44 to slide back down along the tubes 52 and 54 toward the loading end 32 under the force of gravity. In a four-cart system, during removal of the fifth load 38 from the tubes 52 and 54, the fourth cart 41 begins to slide back down the tubes and return to the loading end 32 of the cart lane 34. Once the fourth cart 41 reaches the loading end 32, the lower surface 85 of the push plate 81, being mounted at the first cart's trailing end 82, comes into contact with the beam 24 extending across the lane's loading end 32. When the operator removes the next load 38 positioned on the first cart 41, the second cart 42 begins to slide back down the tubes and over the top of the first cart 41 into the loading end 32 of the cart lane 34. However, unlike the first cart 41, the trailing edge 102 of the second cart 42 does not make contact with the beam 24.

Figure 10:
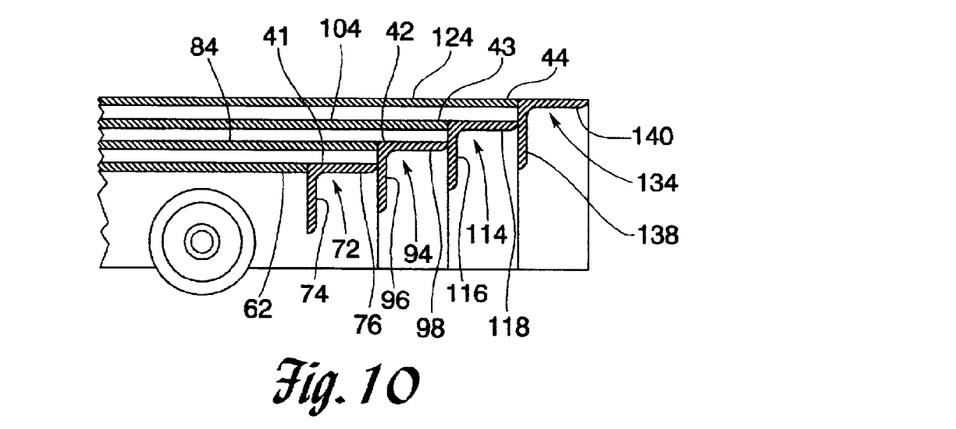
FIG. 10 is a side view of the leading edges of the carts of the push back storage system of FIG. 3 depicting the leading angle plates of the individual carts.
Figure 11:
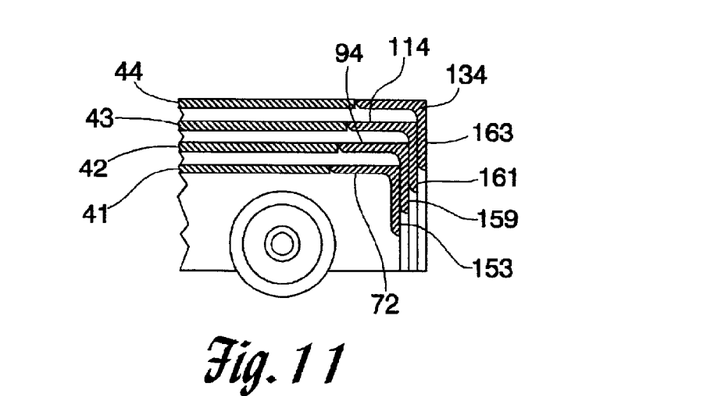
FIG. 11 is a side view of an alternate embodiment of the leading edges of the carts of the push back storage system that is the subject of the invention depicting the leading angle plates of the individual carts.

FIG. 10 is a side sectional view of the relative positioning of the leading angle plates 72, 94, 114, and 134 of the carts 41, 42, 43 and 44, respectively when all the carts are at the loading end 32 of their respective lane 34. Consider the second cart 42 returning to the loading position 32 after the unloading of the first cart 41. According to this invention, the vertical surface 96 of the leading angle plate 94 of the second cart 42 contacts the end of the horizontal surface 76 of the leading angle plate 72 of the first cart 41. Referring to FIGS. 3 and 4 along with FIG. 10, the contact between these two surfaces of the structural members at the leading ends of the carts 41 and 42 restricts subsequent movement of the second cart 42 down the inclined tubes 52 on which it is mounted. Thus, loading end impact between the various carts occurs at the carts' leading ends rather than at the carts' trailing ends. This impact relationship is repeated between the angle plates 114 of cart 43 and 44 of cart 42 and between angle plates 134 of cart 44 and 114 of cart 43.

Figure 9:
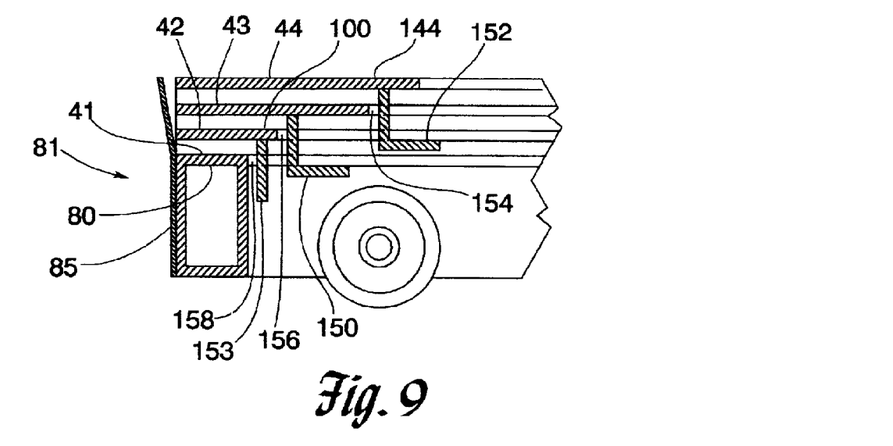
FIG. 9 is a side view of the trailing edges of the carts of the push back storage system of FIG. 3 depicting the loading plates and stiffeners of the individual carts.

FIG. 9 is a side view of the trailing ends of the various carts in a typical 5-deep system made in accordance with this invention when the trailing connecting tube 80 of the first cart 41 and the loading plates 100, 120, and 144 of the second, third and fourth carts 42–44 are all positioned at the loading end of the cart lane 32. That is, all of the leading ends of the carts 41–44 have contacted and restricted the movement of each adjacently higher cart as shown in FIG. 10, and the loading plates of the carts 41–44 do not contact one another and do not transmit force between loads.

In FIG. 9 according to another aspect of this invention, stiffener angle plates 150 and 152 have been added to the bottoms of the loading plates 120 and 144, respectively, and a stiffener flange plate 153 has been added to the bottom of the loading plate 100, respectively. These added stiffener plates 150, 152 and 153 serve to give additional cross member strength to their respective loading plates 100, 120, and 144, thereby adding additional cross strength to each plate's respective carts 42–44, enabling each cart to bear heavier loads. These stiffener plates 150, 152 and 153 are staggered beneath the carrying surfaces of the carts to enable the carts to have a low profile, while increasing their load capacity.

In accordance with the above, FIG. 9 shows the gap 154 between stiffener plate 152 and loading plate 120, gap 156 between stiffener plate 150 and loading plate 100 and gap 158 between stiffener 153 and connecting tube 80 after all the carts 41–44 have made contact through their leading angle plates 72, 94, 114 and 134, respectively, as shown in FIG. 10. Moreover, contact with the first cart's push plate 81 is not made by any of the second, third, or fourth carts 42–44 due to the tilt of the upper portion 83 of the push plate 81. As a result, contact of every higher cart 42–44 with the beam 24 of the cart lane 32 is made only indirectly through the first cart 41. Consequently, all impact forces exerted on the beam 24 are exerted indirectly only through the lower surface 85 of the push plate 81.

Referring now to FIGS. 3 and 4, the side angle plates 62, 84, and 124 of the first, second, and fourth carts 41, 42, and 44 each have a number of downward reaching retaining hooks 160, 162, and 164, with each safety hook 160, 162, and 164 having a horizontal locking surface 166, 168, and 170, all respectively positioned. The horizontal locking surfaces 166, 168, and 170 each extend under flanges 172, 174, and 176 that are adjacent their respective carts. Each of the flanges 172, 174, and 176 are positioned below the respective tube edges 58, 60, and 59 under which their respective carts' wheels 68, 90, and 130 roll and extend along the length of their respective tubes 52 and 56. In the event of a vertical movement, such as an accidental lifting by the operator's loading equipment of one or more of the first, second, or fourth carts 41, 42, and 44, the resulting upward movement of the hooks 160, 162, and 164 causes the horizontal locking surfaces 166, 168, and 170 to contact with each hook's respective flange 172, 174, and 176, restricting further cart movement and preventing disengagement of the carts 41, 42, and 44 from their proper positioning.

In order to maintain approximate incremental sizing of the carts 41–44, it is necessary to omit the positioning of hooks and flange assemblies to restrict vertical movement of the third cart 43. As described above, the second horizontal surfaces 88 of the third cart's side angle plates 84 extend inwardly from the angle plates' vertical surfaces 86 and toward the middle of the third cart 43. This permits extension flanges 180 to extend from the vertical surfaces 86 of the second cart's side angle plates 84 over the adjacently positioned wheels 110 of the third cart 43 to guard against the possibility of accidental disengagement. This also permits incremental cart spacing without further widening the distance between each adjacent inside tube 52 and outside tube 54. The extension flanges 180 are substantially horizontally planar in shape and extend approximately three-quarters of the outside length of the second cart 42, being centered lengthwise in this dimension on the angle plates 84. In the event of vertical movement of the third cart 42, the third cart's wheels 110 contact the extension flanges 180, which, being connected to the second cart 42, are restricted in upward movement by the second cart's hooks 162 and flanges 174. This arrangement thus prevents accidental disengagement of the third cart 43 without requiring the added space of separate hooks proximate to the directional line of travel of the third cart's wheels 110.

Figure 6:
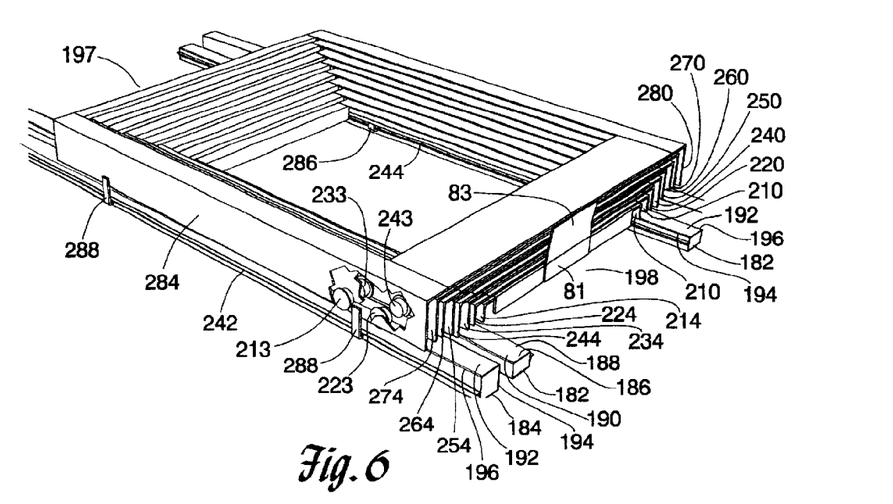
FIG. 6 is perspective view of an independent push back storage system as would typically occupy one cart lane having five individual and unloaded carts as if positioned at the loading end of a particular lane.
Figure 7:
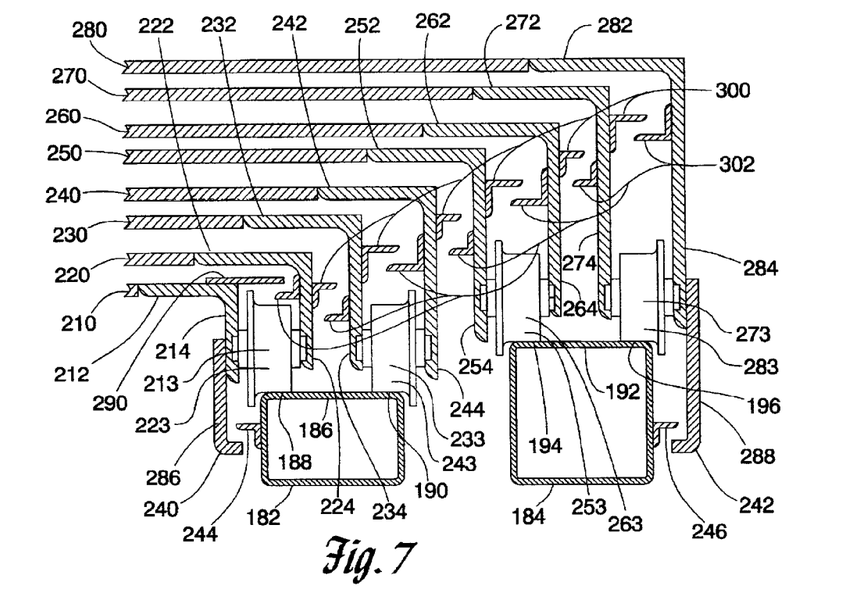
FIG. 7 is a front view of two adjacent tubes from the push back storage system of FIG. 6 depicting the respective wheels, angle plates, and hold-down cart components positioned adjacent to the depicted tubes.
Figure 8:
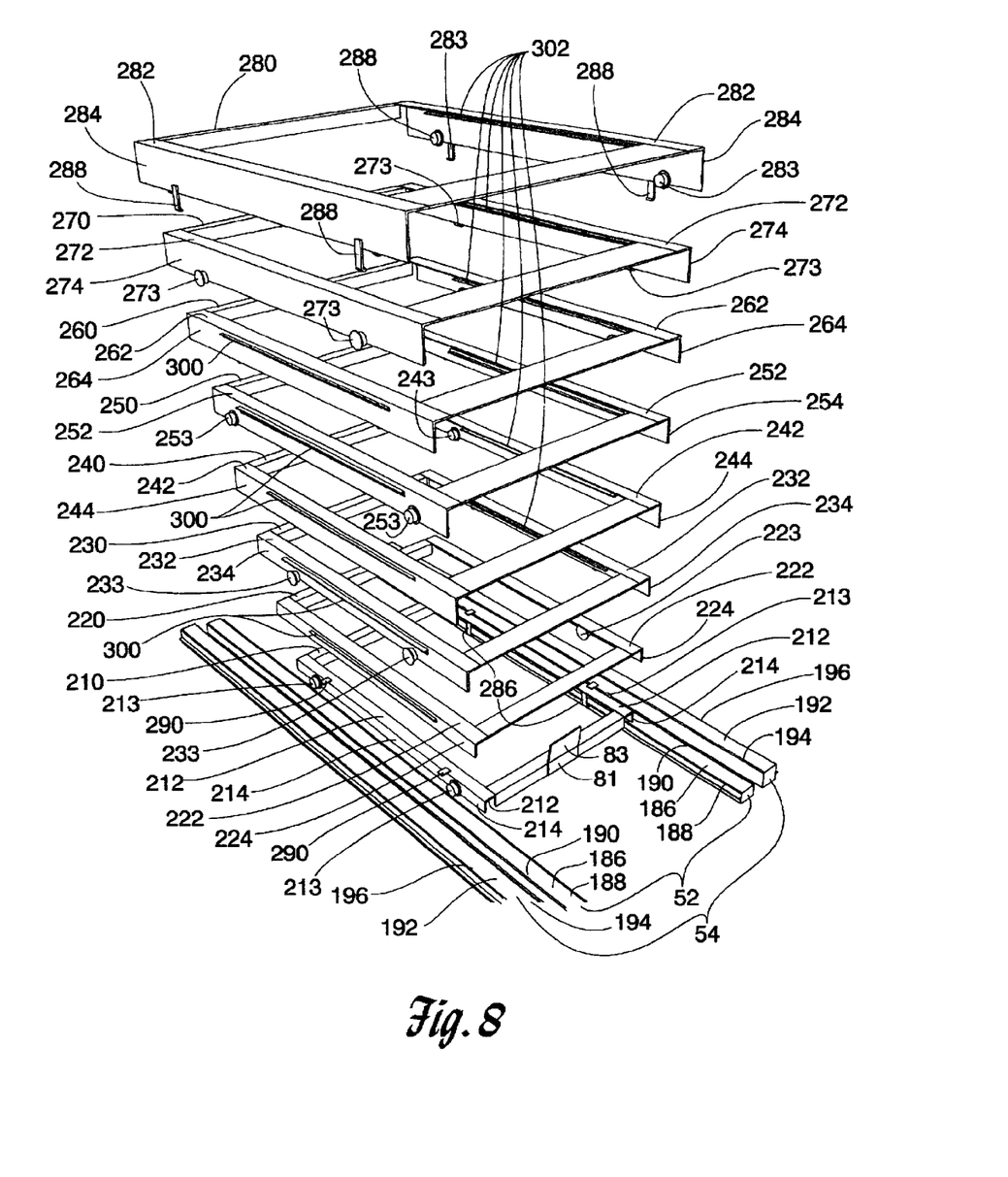
FIG. 8 is an exploded view of the push back storage system of FIG. 6 depicting the structural details of the individual carts of the system.

In an optional embodiment of the design, up to four additional carts may be placed in a single storage lane without increasing the number of tubes needed for the storage system. Referring to FIGS. 6 and 7, this embodiment incorporates an inside and an outside pair of inclined tubes 182 and 184. The inside pair of tubes 182 has an upper support surface 186 having an inside edge 188 and an outside edge 190. The outside pair of tubes 184 also each include an upper support surface 192 divided into inside and outside edges 194 and 196. Unlike the previously-described embodiment for systems of up to four carts, the upper support surfaces 192 of the outside tubes 184 are vertically spaced above the upper support surfaces 192 of the inside tubes 182 rather than all support surfaces being at an approximately even level.

As is best understood comparing FIG. 6 to FIG. 7, the first cart 210 includes side angle plates 212 having vertically planar surfaces 214, each vertically planar surface 214 disposing leading and trailing wheels 213 that extend outwardly and away from the middle of the first cart 210. The first cart's wheels 213 are positioned to roll on the inside surfaces 188 of the inside tubes 182. The second cart 220 also includes angle plates 222 having vertically planar surfaces 224, each vertically planar surface 224 disposing leading and trailing wheels 223 that extend inwardly and toward the middle of the second cart 220. The second cart's wheels 223 are also positioned to ride on the inside surfaces 188 of the inside tubes 182. In order to allow both the wheels 213 and 223 of the first and second carts 210 and 220 to run on the same inside edges 188 of the inside tubes 182, the trailing wheels 213 of the first cart 210 are positioned between the leading and trailing wheels 223 of the second cart 220, thereby interlocking the wheels 213 and 223 and allowing for relative movement along the same directional line defined by the inside tubes' inside edges 188.

Again, as is best understood comparing FIG. 6 to FIG. 7, the third cart 230 includes side angle plates 232 having vertically planar surfaces 234, each vertically planar surface 234 disposing leading and trailing wheels 233 that extend inward and toward the middle of the third cart 230. The third cart's wheels 233 are positioned to roll on the outside surfaces 190 of the inside tubes 182. The fourth cart 240 also includes angle plates 242 having vertically planar surfaces 244, each vertically planar surface 244 disposing leading and trailing wheels 243 that extend inwardly and toward the middle of the fourth cart 240. The fourth cart's wheels 243 are also positioned to ride on the outside surfaces 190 of the inside tubes 182. In order to allow both the wheels 233 and 243 of the third and fourth carts 230 and 240 to run on the same outside edges 190 of the inside tubes 182, the trailing wheels 233 of the third cart 230 are positioned between the leading and trailing wheels 243 of the fourth cart 240, thereby interlocking the wheels 233 and 243 and allowing for relative movement along the same directional line defined by the inside tubes' outside edges 190.

This relative arrangement pattern repeats itself for the carts 250, 260, 270 and 280 positioned on the outside pair of tubes. The fifth cart 250 includes side angle plates 252 having vertically planar surfaces 254, each vertically planar surface 254 disposing leading and trailing wheels 253 that extend outward and away from the middle of the fifth cart 250. The fifth cart's wheels 253 are positioned to roll on the inside surfaces 194 of the outside tubes 184. The sixth cart 260 also includes angle plates 262 having vertically planar surfaces 264, each vertically planar surface 264 disposing leading and trailing wheels 263 that extend inwardly and toward the middle of the sixth cart 260. The sixth cart's wheels 263 are also positioned to ride on the inside surfaces 194 of the outside tubes 184. In order to allow both the wheels 253 and 263 of the fifth and sixth carts 250 and 260 to run on the same inside edges 194 of the outside tubes 184, the trailing wheels 253 of the fifth cart 250 are positioned between the leading and trailing wheels 263 of the sixth cart 260, thereby interlocking the wheels 253 and 263 and allowing for relative movement along the same directional line defined by the outside tubes' inside edges 194.

The two highest carts are similarly interlocked. The seventh cart 270 includes side angle plates 272 having vertically planar surfaces 274, each vertically planar surface 274 disposing leading and trailing wheels 273 that extend outward and away from the middle of the seventh cart 270. The seventh cart's wheels 273 are positioned to roll on the outside surfaces 196 of the outside tubes 184. The eighth cart 280 also includes angle plates 282 having vertically planar surfaces 284, each vertically planar surface 284 disposing leading and trailing wheels 283 that extend inwardly and toward the middle of the eighth cart 280. The eighth cart's wheels 283 are also positioned to ride on the outside surfaces 196 of the outside tubes 184. In order to allow both the wheels 273 and 283 of the seventh and eighth carts 270 and 280 to run on the same outside edges 196 of the outside tubes 196, the trailing wheels 273 of the seventh cart 270 are positioned between the leading and trailing wheels 283 of the eighth cart 280, thereby interlocking the wheels 273 and 283 and allowing for relative movement along the same directional line defined by the outside tubes' outside edges 196.

Due to the greater number of carts being present in a similarly confined space, this later cart-and-tube arrangement for systems of up to eight carts is inherently more crowded than are embodiments for up to four carts only. Consequently, a different system must be incorporated to prevent accidental disengagement due to accidental cart lifting. In FIGS. 6 and 7, downward reaching retaining hooks 286 and 288 extend from the side angle plates 212 and 282 of the first cart 210 and eighth cart 280, each disposing horizontal locking surfaces 240 and 242 which extend under adjacent flanges 244 and 246. The flanges 244 and 246 are positioned along the lengths of the inside tubes 182 below the tubes' inside edges 188 and along the outside tubes 184 below the tubes' outside edges 196. In the event of vertical movement of the first or eighth carts 210 or 280, the horizontal locking surfaces 240 and 242 of the retaining hooks 286 and 288 lock against the flanges 244 and 246, restricting the carts' movement and preventing accidental tube disengagement.

Focusing now on FIG. 7, horizontally planar top flanges 290 are positioned on the side angle plates 214 of the first cart 210 extending outwardly from the middle of the first cart 210 and over a lower angle flange 302 mounted on the side angle plate 222 of the second cart 220. The lower angle flanges 302 are substantially horizontally planar, extending approximately three-quarters the length of their respective second cart 220 on the cart's side angle plates 220 and approximately centered on the side angle plates' vertical surfaces 224 in the horizontal dimension. In the event of vertical movement of the second cart 220, the second cart's lower angle flanges 302 collide with the planar top flanges 290, which, as part of the first cart 210, are restricted in movement by the retaining hook 286. Thus, the contact between the second cart's lower angle flanges 302 and planar top flanges 290 restricts further upward movement of the second cart 220. To restrict higher level carts, the second through seventh carts 220, 230, 240, 250, 260, and 270 each dispose top angle flanges 300 on their respective side angle plates 222, 232, 242, 252, 262, and 272 which extend outwardly and away from the middles of their respective carts. The top angle flanges 300 of each adjacently lower cart are positioned to contact the lower top flanges 302 and thereby restrict vertical cart movement in the event of accidental lifting of one or more carts. Thus, each second through seventh cart 222, 232, 242, 252, 262, and 272 is ultimately restricted indirectly by the retainer hook 286 of the first cart 210 via the interlocked system of planar and angle flanges 290, 300, and 302. Vertical movement of the eighth cart 284 is restricted by the presence of its own retainer hooks 288 locking against flanges 246.

Those skilled in the art will recognize that the various features of this invention described above can be used in various combinations with other elements without departing from the scope of the invention. Thus, the appended claims are intended to be interpreted to cover such equivalent push back rack systems which do not depart from the spirit and scope of the invention.

What is claimed is:

1. A push back storage rack system for storing multiple loads in a single inclined cart lane comprising:

a storage rack structure forming a single inclined cart lane having a loading end at a lowest part of the inclined cart lane, a storage end at a highest part of the inclined cart lane, and a support beam located at said loading end of said inclined cart lane;

a plurality of carts including a first cart having a structure which enables it to carry and move at least one load in said cart lane, said first cart including a leading end and a trailing end, said leading end of said first cart always being positioned farther away from said loading end of said inclined cart lane than said trailing end of said cart is positioned, said first cart having at least two parallel and elongated side plates, a leading cross piece extending between said side plates at about the leading end of said first cart, said cart contacting said support beam when said first cart is at said loading end of said inclined cart lane;

at least one higher cart having a structure which enables said at least one higher cart to carry and move at least one load in said cart lane and causes said at least one higher cart to be spaced to a higher vertical position than said first cart, said at least one higher cart having a leading end and a trailing end, said leading end of said at least one higher cart always being positioned farther away from said loading end of said inclined cart lane than said trailing end of said at least one higher cart is positioned, said at least one higher cart having at least two parallel and elongated side plates;

a leading cross piece extending between said side plates at about said leading end of said at least one higher cart, said leading cross piece of said at least one higher cart being positioned to contact a cart beneath it, said at least one higher cart when both said at least one higher cart and the cart beneath it are at the loading end of said inclined cart lane, so that the load of said at least one higher cart is transferred through said first cart to said support beam.

2. The push back storage rack system of claim 1 in which said leading cross piece of said at least one higher cart contacts the cart beneath it at about a leading cross piece of a cart beneath it so as to restrict the movement toward said loading end of said inclined cart lane of said at least one higher cart.

3. The push back storage rack system of claim 1 in which said leading cross piece of each of said at least one higher cart is positioned to contact the cart immediately beneath it at about a leading cross piece of the cart immediately beneath it when both said at least one higher cart and the cart immediately beneath it are at about the loading end of said inclined cart lane.

4. The push back storage rack of claim 1 in which said leading cross piece of said at least one higher cart is positioned to restrict movement of said at least one higher cart toward said loading end of said inclined cart lane by contacting said leading cross piece of a cart beneath it, and the structure of said plurality of carts prevents said first cart and said at least one higher cart from contacting each other at their trailing ends when said first cart and said at least one higher cart are at about said loading end of said inclined cart lane.

5. The push back storage rack system of claim 1 further comprising:
   an elongated stop flange extending along at least a portion of the length of the inclined cart lane;
   at least one vertically reaching extension mounted on at least one of said plurality of carts, said extension having a locking surface extending therefrom and under said stop flange so that said locking surface is vertically spaced from said stop flange and positioned to restrict vertical lifting of said at least one of said plurality of carts.

6. The push back storage rack system of claim 1 further comprising:
   at least one first substantially horizontal flange mounted along the length of said first cart and extending outwardly therefrom;
   at least one second substantially horizontal flange mounted along the length of said at least one higher cart and extending inwardly therefrom;
   said at least one first substantially horizontal flange positioned to restrict vertical movement of said at least one second substantially horizontal planar stop flange, thereby restricting vertical movement of said at least one higher cart.

7. The push back storage rack system of claim 1 further comprising:
   an elongated stop flange extending along at least a portion of the length of the inclined cart lane;
   at least one vertically reaching extension mounted on said first cart, said extension having a locking surface extending therefrom and under said stop flange so that said locking surface of said extension is vertically spaced from said stop flange to restrict vertical movement of said extension and thus said first cart;
   at least one first substantially horizontal flange mounted along the length of said first cart and extending outwardly therefrom;
   at least one second substantially horizontal flange mounted along the length of a second cart immediately above said first cart and extending inwardly therefrom;
   said first substantially horizontal flange positioned to restrict vertical movement of said second substantially horizontal flange and the said second cart.

8. The push back storage rack system of claim 1 wherein said at least one higher cart comprises a plurality of carts, each of said plurality of carts being constructed to be longer than the cart immediately beneath it.

9. The push back storage rack system of claim 1 wherein said at least one higher cart comprises a plurality of carts, each of said plurality of carts being constructed to be wider and longer than the cart immediately beneath it.

10. The push back storage rack system of claim 1 further comprising:
   a pair of parallel, elongated tracks in said cart lane, each of said tracks having a substantially rectangular, planar upper support surface, each of said upper support surfaces having an inner edge and an outer edge, said tracks being positioned along the length of said cart lane and positioned at a slight incline from horizontal so that the lowest part of each track is positioned near the loading end of said cart lane and the highest part of each track is positioned toward the storage end of said cart lane,
   at least one leading wheel and at least one trailing wheel extending from a first side plate of said first cart, both said leading and trailing wheels of said first side plate of said first cart being positioned to roll along an inner edge of one of said tracks, at least one leading wheel and at least one trailing wheel extending from a second side plate of said first cart, both said leading and trailing wheels of said second side plate of said first cart being positioned to roll along only an inner edge of the other of said tracks;
   at least one leading wheel and at least one trailing wheel extending from a first side plate of a cart immediately above said first cart, both said leading and trailing wheels extending from said first side plate of said cart immediately above said first cart being positioned to roll along only the outer edge of one of said tracks, at least one leading wheel and at least one trailing wheel extending from a second side plate of said cart immediately above said first cart, both said leading and trailing wheels of said second side plate of said second cart being positioned to roll along only the outer edge of the other of said tracks.

11. The push back storage rack system of claim 1 in which each said side plate further comprising an angle plate having an upper section with a major elongated length and a substantially planar upper surface and having a side section with a major elongated length and a substantially planar side surface, said upper section and said side section of each said side angle plate interconnected at about a 90° angle along the major elongated lengths of said sections.

12. The push back storage rack system of claim 1 further comprising:
   said first cart having a trailing cross piece extending between said side plate, a push plate mounted on said trailing cross piece of said first cart, said push plate having a substantially planar lower surface for contacting said support beam and a substantially planar upper portion, said upper portion of said push plate being bent slightly from vertical and leaning away from said first cart to provide clearance between said upper portion of said push plate and each of said at least one higher cart when said first cart and each of said at least one higher cart are at the loading end of said inclined cart lane.

13. A push back storage rack system for storing multiple loads in a single inclined cart lane comprising:
   a storage rack structure forming a plurality of inclined cart lanes, each said inclined cart lane having a loading end at about a lowest part of the inclined cart lane, a storage end at about a highest part of the inclined cart lane, and support from a support beam located at about said loading ends of said inclined cart lanes;

each said cart lane having a plurality of carts including a first cart having a structure which enables it to carry and move at least one load in said cart lane, said first cart including a leading end and a trailing end, said leading end of said first cart always being positioned farther away from said loading end of said inclined cart lane than said trailing end of said cart is positioned, said first cart having at least two parallel and elongated side angle plates, a leading cross piece extending between said side angle plates at about the leading end of said first cart, said cart contacting said support beam when said first cart is at said loading end of said inclined cart lane;

at least one higher cart having a structure which enables said at least one higher cart to carry and move at least one load in said cart lane and causes said at least one higher cart to be spaced to a higher vertical position than said first cart, said at least one higher cart having a leading end and a trailing end, said leading end of said at least one higher cart always being positioned farther away from said loading end of said inclined cart lane than said trailing end of said at least one higher cart is positioned, said at least one higher cart having at least two parallel and elongated side angle plates;

a leading cross piece extending between said side angle plates at about the leading end of said at least one higher cart, said leading cross piece of each said at least one higher cart being positioned to contact a leading cross piece of a cart beneath it when both said at least one higher cart and the cart beneath said at least one higher cart are at about the loading end of said inclined cart lane, so that the load of said at least one higher cart is transferred through said first cart to said support beam.

* * * * *